(12) United States Patent
Crouan

(10) Patent No.: US 7,389,871 B2
(45) Date of Patent: Jun. 24, 2008

(54) DISC SUPPORT INCLUDING BASE FOR ENGAGING A LIKE DISC SUPPORT

(75) Inventor: Alain Crouan, Le Mans (FR)

(73) Assignee: Moulage Industriel de Perseigne "MIP", Mamers (FR)

( * ) Notice: Subject to any disclaimer, the term of this patent is extended or adjusted under 35 U.S.C. 154(b) by 470 days.

(21) Appl. No.: 10/498,500

(22) PCT Filed: Dec. 17, 2002

(86) PCT No.: PCT/FR02/04409

§ 371 (c)(1),
(2), (4) Date: May 3, 2005

(87) PCT Pub. No.: WO03/054884

PCT Pub. Date: Jul. 3, 2003

(65) Prior Publication Data

US 2005/0199518 A1    Sep. 15, 2005

(30) Foreign Application Priority Data

Nov. 20, 2001  (FR) .................................. 01 16590

(51) Int. Cl.
*B65D 85/57* (2006.01)
*B65D 21/028* (2006.01)
(52) U.S. Cl. ...................... 206/310; 206/308.1; 206/509
(58) Field of Classification Search ............. 206/308.1, 206/310, 303, 493, 503, 509, 511
See application file for complete search history.

(56) References Cited

U.S. PATENT DOCUMENTS

| 4,709,812 | A |   | 12/1987 | Kosterka |
| 5,450,953 | A |   | 9/1995  | Reisman |
| 5,462,158 | A | * | 10/1995 | Kramer ..................... 206/307 |
| 5,609,249 | A |   | 3/1997  | Cheng |
| 5,697,496 | A |   | 12/1997 | Bauer |
| 5,819,926 | A |   | 10/1998 | O'Brien et al. |
| 6,059,102 | A |   | 5/2000  | Gelardi et al. |
| 6,568,526 | B1 | * | 5/2003 | Reinhardt et al. ........... 206/310 |
| 6,636,475 | B2 | * | 10/2003 | Carstensen ................. 369/281 |
| 7,051,871 | B2 | * | 5/2006 | Loritz ..................... 206/308.1 |

* cited by examiner

*Primary Examiner*—J. Gregory Pickett
(74) *Attorney, Agent, or Firm*—Leydig, Voit & Mayer, Ltd.

(57) ABSTRACT

A base for holding a disk on which data may be recorded. The base includes a skirt from which elastic tabs depend, free ends of the skirt forming a rim. The rim includes a clipping structure that releasably engages another base. The bases, when engagedly stacked, are fed to a machine for gluing to supports.

7 Claims, 2 Drawing Sheets

_U.S. Pat. No. 7,389,871 B2_

DISC SUPPORT INCLUDING BASE FOR ENGAGING A LIKE DISC SUPPORT

FIELD OF THE INVENTION

The present invention has as a goal, a flange on a disc support for supporting a digital audio disc such as a DVD, CD, CD-ROM that may be stacked with identical disc supports.

BACKGROUND

These information discs include a central hole designed especially for their storage and their mounting on the reading apparatuses; in most cases this hole has a diameter of 15 mm. For distribution to the general public, these discs are included in a case and kept in the latter by latching onto a flange if a disc support. The latter usually comprises a certain number of projecting elastic tabs on a base. At the upper end of the tabs and on the outer side, a rim is provided for which the diameter of the covering curve is slightly greater than that of the central hole of the disc such that when the disc is placed on the base, the tabs are first brought toward the center of the base, then by elasticity, find their original position again after placement of the disc on the base, which keeps the latter in position on the base while allowing removal of the disc. The outer shape of the tabs is cylindrical to correspond to the diameter of the central hole of the disc.

Originally, the entire support plus base was produced in a single operation by injection of plastic material such as polystyrene. Now, for several practical reasons, especially printing, the original plastic case is being replaced by a cardboard cover, the base remaining in plastic material because of its mechanical qualities. This base is generally glued onto the cardboard plate.

In order to reduce packaging costs, the production of such packages is carried out on automatic machines at very high speed.

The problem posed and resolved by this invention, is that of feeding the automatic machines for handling bases.

SUMMARY OF THE INVENTION

The invention is based on the idea that it is possible to use retractable tabs for carrying out the assembly or stacking of several bases, the stacks being formed for handling ease and so that they may be easily introduced into a machine which may sample them individually at a very high rate.

According to the invention, the base includes projecting elastic tabs the free ends of which present a rim which has on a lower part means for engaging and latching the upper part of another base.

Advantageously, these latching means consist of a snap ring or rib, possibly discontinuous, the internal diameter of which is less than the outside diameter of a cylinder covering of rims or pins such that, during the insertion of the upper part of a base, these means cause brief moving aside of the elastic tabs. Then after continuation of the movement, the tabs return to the interior of the snap ring, ensuring holding of one base in the bottom of another base.

Thus, it is possible to latch the upper part of a base in the lower part of another base and to form a stack or roll that may easily be handled and introduced into a machine for placing bases on any supports, especially by gluing onto cardboard.

According to another characteristic of the invention, the interior diameter of the snap ring is approximately equal to the diameter of the cylinder covering the tabs of the base, below the rim or upper projection.

The interior diameter of the snap ring may be defined by a gadroon.

The snap ring may be arranged at the bottom of the tabs and on the latter and be a group of evenly distributed pins. It may also be located in the lower part of the base.

The invention also provides a roll or a stack of bases as defined above, one locked with or on the other.

BRIEF DESCRIPTION OF DRAWINGS

Other characteristics and advantages of the invention will appear during the description of a specific embodiment that follows, given only by way of nonlimiting example, in regard to the drawings that represent.

The same reference numbers designate the same parts in all the figures.

DETAILED DESCRIPTION

Figure 1:
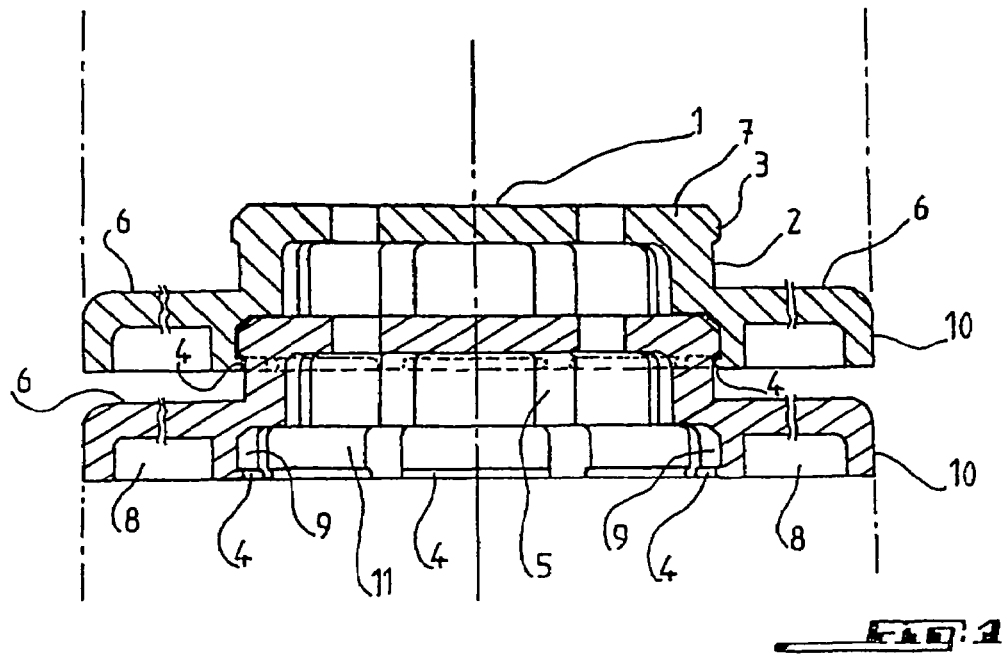
FIG. 1, a section along line I-I of FIG. 2 of two superimposed bases.

In FIG. 1 it is seen that a base includes an upper plate 1 at the top of a cylinder 2. This cylinder rests on a skirt 6. The skirt 6 and upper plate 1 include slits 5 that are approximately radial. These slits delimit elastic tongues 7. In the specific embodiment represented, plate 1 and cylinder sides 2 form a center for a disc on the base and the diameter of the cylinder 2 is equal to the diameter of the circular hole of the disc (not represented). But, of course, the invention may be applied in the case where this centering does not exist, only elastic tabs forming a catching collar in this case.

At each tab 7 a rim 3 is provided with a rounded or beveled shape. It is the contact of this rim by the hole of the disc (not represented) which causes the displacement of the upper part of the tabs 7 towards the center of the base and the passage of the disc around the cylinder 2. The return of the tabs to their original position holds the disk against the skirt 6 which forms a support surface for the central collar of the disc. That which has just been described corresponds to a standard base.

According to the invention, the skirt 6 rests on any support through a cylindrical depending rim 10. Within the rim 10 a snap ring or coaxial rib 9 is formed. The rib 9 forms a cylindrical chamber 11 which the upper parts of the tabs 7 from another base will enter.

In conformance with the invention, the rib 9 at its lower part presents pins or gadroons 4 projecting within the central cavity. The passage of the tabs 7 of the lower flange on these gadroons causes deformation of the tabs 7 and the latching of the latter against the side of the rib 9. Of course, the internal diameter of the rib 9 is equal to the external diameter of the cylinder 2, or is slightly greater such that the cylinder 2 may be introduced into the cavity 11 without extensive friction, other than that of the rims 3 of tabs 7.

That is, as in the case of mounting a disc on a base, the introduction of the upper part of a lower base into the bottom of an upper flange causes tightening of the tabs 7 of the lower base towards the center, which allows latching of the latter with the upper or preceding base when the assembly is made on the rim.

Between the snap ring 9 and the rim 10 an annular chamber 8 is formed, which especially has the goal of receiving an adhesive for attaching on any support after its injection, of course after separation of the base from the stack or roll in which it has been integrated during production.

Figure 2:
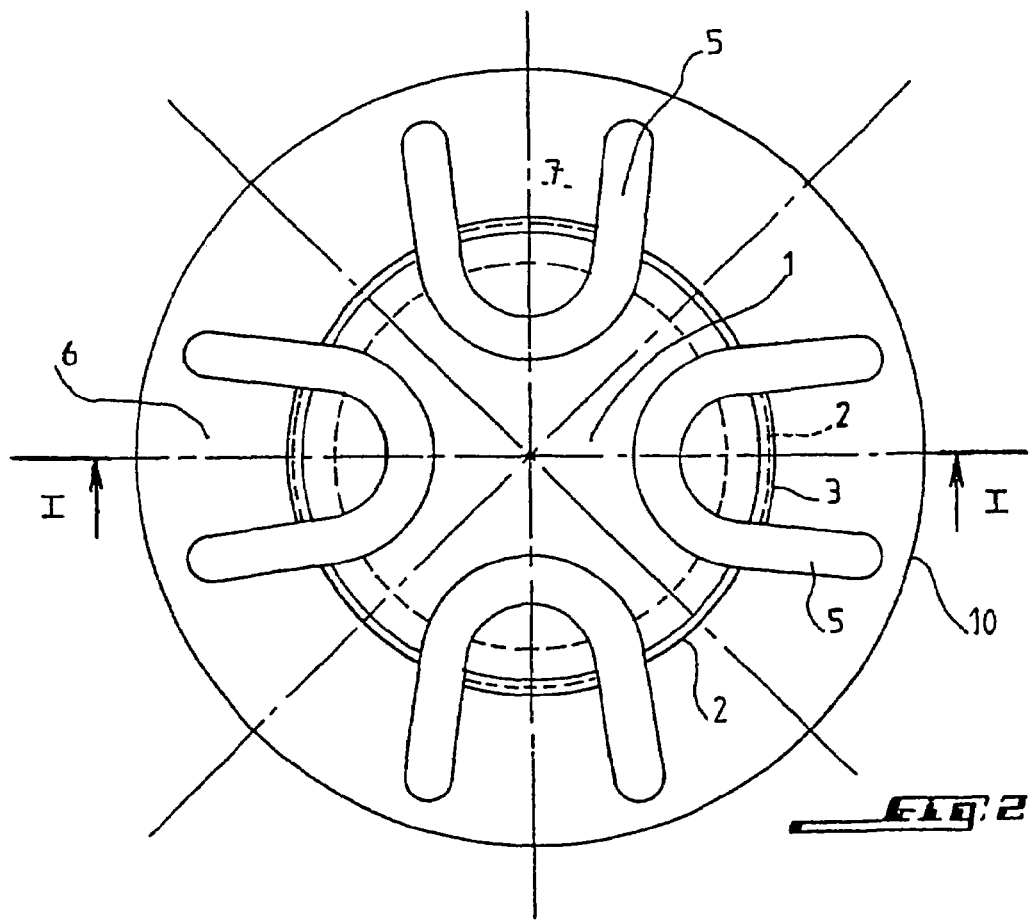
FIG. 2, a top view of a base.

FIG. 2 represents a top view of a specific flange given by way of example. This flange has an axial symmetry of revolution. Four slits in a "U" shape determine four tabs 7. It is seen in this figure that only the tabs 7 present a rim 3, the outer diameter of which is larger than that of the cylinder 2. But the base may be formed only from a group of tabs, in any number, all presenting a rim or projection 3 that allows their temporary approach toward the center.

Figure 3:
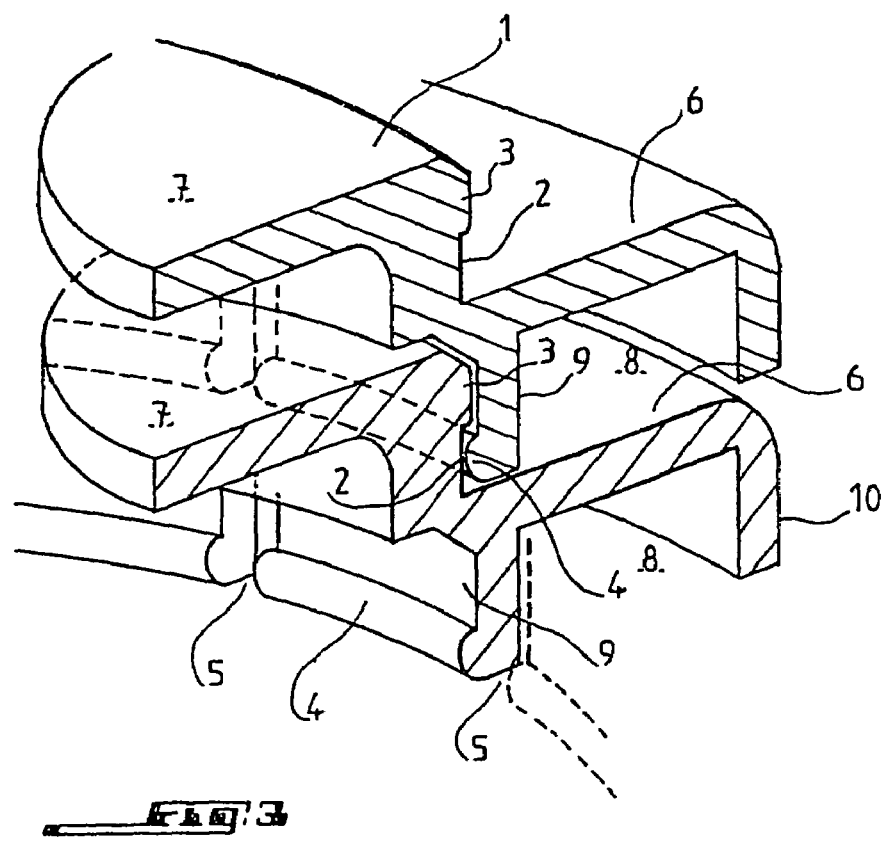
FIG. 3, a perspective view of the latching of one elastic tab on another.

FIG. 3 represents, in partial section, an assembly of two tabs, each belonging to a base, superimposed in a stack. On each of the latter tabs, rims 3 project laterally above the skirt 6 with a height approximately equal to the thickness of a disc. The diameter of the cylindrical sector 2 corresponds approximately to the diameter of the hole of the disc. In this example the gadroon 4 is approximately semicylindrical in section. Its presence requires a tab 7 to be folded in the direction of the center.

Figure 4:
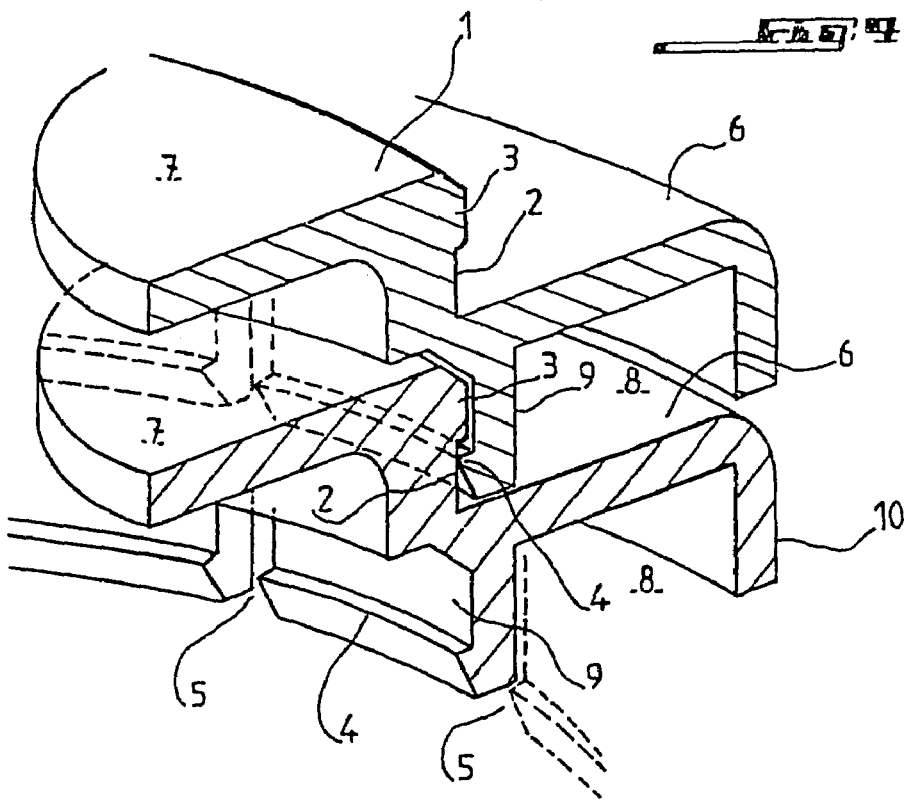
FIG. 4, another embodiment of the latching snap ring.

In FIG. 4, the gadroon 4 is bisected, which facilitates the assembly of two bases.

It goes without saying that numerous variants may be provided, especially by substitution of equivalent technical means, without leaving the scope of the invention. In particular, it may be adapted to flanges that are not cylindrical in shape.

The invention claimed is:

1. A base for holding a disc on a support, the base being generally symmetrical about a central axis and including:
   a circumferential skirt;
   elastic tabs projecting generally transverse to the skirt, each elastic tab having a free end including a rim; and
   latching means extending from the skirt for latching another base, the latching means including a discontinuous snap ring having an interior diameter smaller than an outer diameter of the rim, and including a gadroon at an outer edge of the interior diameter of the snap ring, wherein the gadroon has an inner diameter approximately equal to an outer diameter of a cylinder of the elastic tabs.

2. The base according to claim 1, wherein the snap ring is located proximate a remote end of the tabs, on the tabs.

3. The base according to claim 1 wherein the snap ring is located within the skirt.

4. A stack of the bases according to claim 1, latched serially.

5. A base for holding a disc on a support, the base being generally symmetrical about a central axis and including:
   a circumferential skirt;
   elastic tabs projecting generally transverse to the skirt, each elastic tab having a free end including a rim; and
   latching means extending from the skirt for latching another base and including a discontinuous rib having an interior diameter smaller than an outer diameter of the rim, and including a gadroon at an outer edge of the interior diameter of the rib, wherein the gadroon has an inner diameter approximately equal to an outer diameter of a cylinder of the elastic tabs.

6. The base according to claim 5, wherein the rib is located proximate a remote end of the tabs, on the tabs.

7. The base according to claim 6 wherein the rib is located within the skirt.

\* \* \* \* \*